United States Patent

Engelhardt

[15] 3,706,925
[45] Dec. 19, 1972

[54] POWER REGULATING AMPLIFIER SYSTEM

[72] Inventor: Bjorn H. Engelhardt, Barrington, R.I.

[73] Assignee: Raytheon Company, Lexington, Mass.

[22] Filed: May 25, 1971

[21] Appl. No.: 146,716

[52] U.S. Cl. .................323/22 T, 321/45 R, 340/10
[51] Int. Cl. ..........................G05f 1/44, H04b 13/02
[58] Field of Search ..............321/18, 45 R; 323/22 T

[56] References Cited

UNITED STATES PATENTS

3,365,650  1/1968  Camp et al...........................321/45 R
3,293,530  12/1966  Baude..................................321/18 X Primary Examiner—A. D. Pellinen
Attorney—Milton D. Bartlett

[57] ABSTRACT

A directional transducer system adapted for generating signals indicative of the direction of a source of radiant energy submerged in a fluid medium. This system is particularly useful in sonar applications which contemplate the use of a multisectioned transducer with arithmetic means for combining the signals received by each of these transducer sections to provide a set of three signals, namely, a reference signal and two coordinate signals which are suitable for transmission via a telemetry link to a utilization device such as a display. Means are also disclosed for compressing the dynamic range of the signals to facilitate their transmission via a telemetry link as well as means for energizing a transducer with a signal having an average power independent of a variation in the supply voltage utilized in energizing the circuitry of the invention.

12 Claims, 7 Drawing Figures

POWER REGULATING AMPLIFIER SYSTEM

BACKGROUND OF THE INVENTION

While transducer systems have been used in the past, they have often utilized transformer coupling of received signals from the transducer for combining these signals such as is shown in the U.S. Pat. to Ehrlich et al. No. 3,176,262 which issued on Mar. 30, 1965. As is well known, transducers are frequently incorporated into a sonobuoy for immersion in the ocean waters and it is, accordingly, most desirable to minimize the size of the various electrical components. At the low frequencies utilized in sonar systems, particularly with passive listening of sounds generated by remote objects, transformers tend to be a relatively large component utilizing much of the space in a sonobuoy. A further problem in such systems is the preparation of signals received from a transducer for transmission via a telemetry link to a utilization device such as may be carried by a vehicle remote from the sonobuoy or in a receiving station on the shore of the ocean. In particular, it is frequently desirable to compress the dynamic range of the signals in applications where directional information is to be obtained based on the relative phases of these signals. To preserve the measurement accuracy it is necessary to compress (or attenuate) the signals in equal amounts to avoid introducing any phasing error resulting from unequal compression. Thus, for example, in a transducer system utilizing an arithmetic unit to combine signals received from various portions of a transducer to produce the well known three channel arrangement of a reference signal and two other signals representing rectangular coordinate vector components of the direction of the source of radiant energy, the problem frequently arises as to the implementation of some form of gain control system which varies the gain equally for each of the three channels. A further problem arises in that the power transmitted by such transducers in battery powered sonobuoys tends to decrease as the battery gradually wears out.

SUMMARY OF THE INVENTION

In accordance with the invention, the foregoing problems are overcome by a system which provides an arithmetic unit utilizing a plurality of operational amplifiers having differential inputs connected to sets of summing resistors which combine the output signals from a transducer to form the sums and differences of these transducer signals. In a preferred embodiment of the invention, a cylindrical transducer responsive to the direction of incident sonar radiation in an azimuthal plane is utilized, the transducer being composed of four quandrant cylindrical sections each having an inner and outer terminal in the form of a metallic conducting sheet to form an array of four receptors of sonic energy, each of these receptors providing signals which differ in their relative phases in accordance with the direction of incident radiation. Each of these receptors are connected in circuit with the summing resistors of the arithmetic unit via a transmit-receive switching circuit which permits both the transmission and reception of sonic energy via the same elements of the transducer array. The transmit-receive circuitry incorporates back-to-back diodes which provide a conducting path for the energization of the transducer for transmission while limiting the amplitude of such transmitted energy passing on into the arithmetic unit.

To minimize the bandwidth required to transmit the signals from the arithmetic unit to a remote station via a telemetry system, the signals from the arithmetic unit are passed through an attenuation circuit utilizing the emitter-collector terminal pairs of a plurality of transistors fabricated upon a common substrate and having virtually identical electrical characteristics so that in response to base current the impedance of each of these transistors varies in the same manner so that each of the signals from the arithmetic unit are equally attenuated. As is well known in telemetry systems utilizing phase or frequency modulation of a carrier or a subcarrier, the required transmission bandwidth is related to the magnitude of the modulation index so that with smaller modulation indices, reduced bandwidth is possible. In the present system, directional information can be obtained with compressed signals. In the preferred embodiment the arithmetic unit provides directional information in the form of two coordinate axis signals, namely, a north-south signal and an east-west signal, and also provides a third channel having a signal utilized as a reference in resolving phase ambiguities of the north-south and east-west signals. The reference signal is formed by the addition of the several signals from the four quadrants of the transducer in the manner of an omnidirectional transducer signal.

The transducer system of the invention further comprises a circuit which accepts a signal from a remote source and applies this signal at a predetermined power level to the transducer. The circuit is adapted for use with an energy storage battery and provides a substantially constant output average power to the transducer independently of variations in the battery voltage. The circuit comprises symmetrically arranged clipping amplifiers having a clipping level in response to a bias voltage for clipping the input signal, typically a sinusoid, to provide an output trapezoidal waveform having a duty cycle which varies in accordance with the level at which the input sinusoid is clipped. The trapezoidal waveform is converted to a substantially sinusoidal waveform by the interconnection of the output of the circuit with a tuned transducer load. A detection circuit compares the output power level to a reference and, in response thereto, adjusts the bias voltage.

BRIEF DESCRIPTION OF THE DRAWINGS

The aforementioned features and other advantages of the invention are explained in the following description taken in connection with the accompanying drawings wherein.

DESCRIPTION OF THE PREFERRED EMBODIMENT

Figure 1:
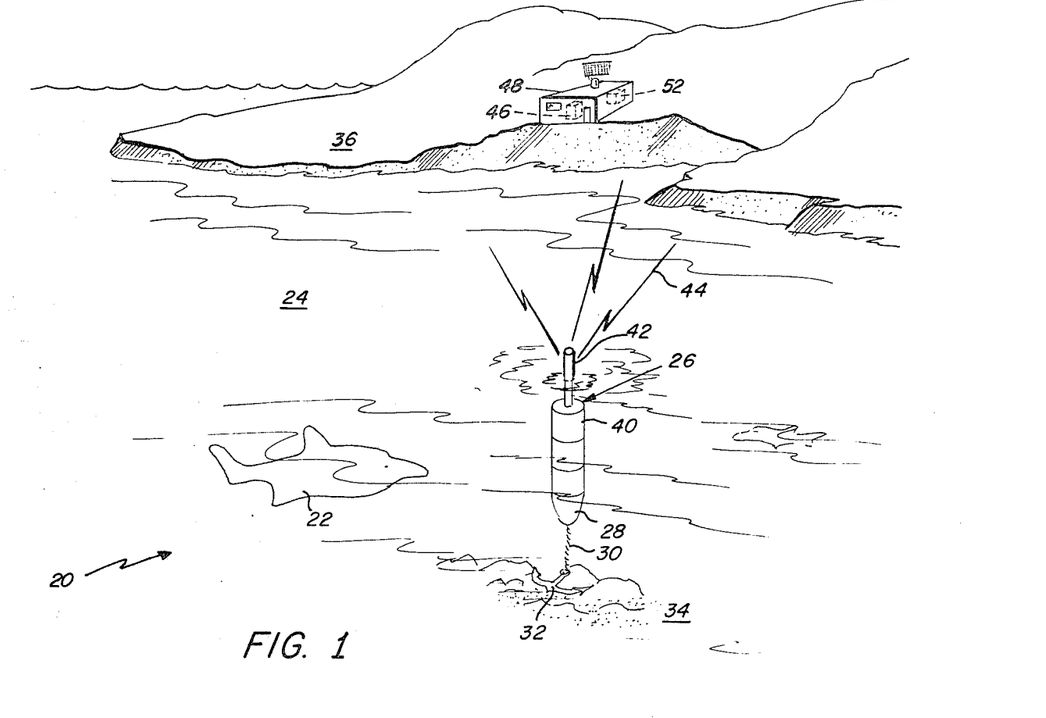
FIG. 1 is a pictorial representation of the transducer system of the invention in which a sonobuoy containing a transducer and circuitry of the invention is affixed in shallow waters for monitoring offshore marine life.

Referring now to FIG. 1 there is shown a transducer system 20 in accordance with the invention for monitoring the presence of submerged objects such as marine life 22 submerged in the ocean 24. A sonobuoy 26 having a transducer 28 at its lower end is moored via a chain 30 to an anchor 32 on the ocean bottom 34 at a distance from the shore 36 for receiving sounds radiated from the marine life 22 as well as for receiving echoes of radiant energy reflected from the marine life 22 in response to sonic vibrations set up in the ocean 24 by the transducer 28. The sonobuoy 26 utilizes a well known telemetry system indicated by numeral 38 in FIG. 5 and comprising, with reference to FIG. 1, a transceiver 40 in the sonobuoy 26, and antenna 42 protruding above the waters of the ocean 24 for transmitting and receiving electromagnetically radiated signals 44 with a transceiver 46 at a station 48. The station 48 also contains a signal processor 50, seen in FIG. 5, which comprises a display 52, seen in both FIGS. 1 and 5, for indicating the direction of the marine life 22 relative to the sonobuoy 26. The signal processor 50 also comprises a signal generator 54 for generating a signal with suitable modulation for transmission by the transducer 28 to facilitate identification of the marine life 22.

Figure 2:
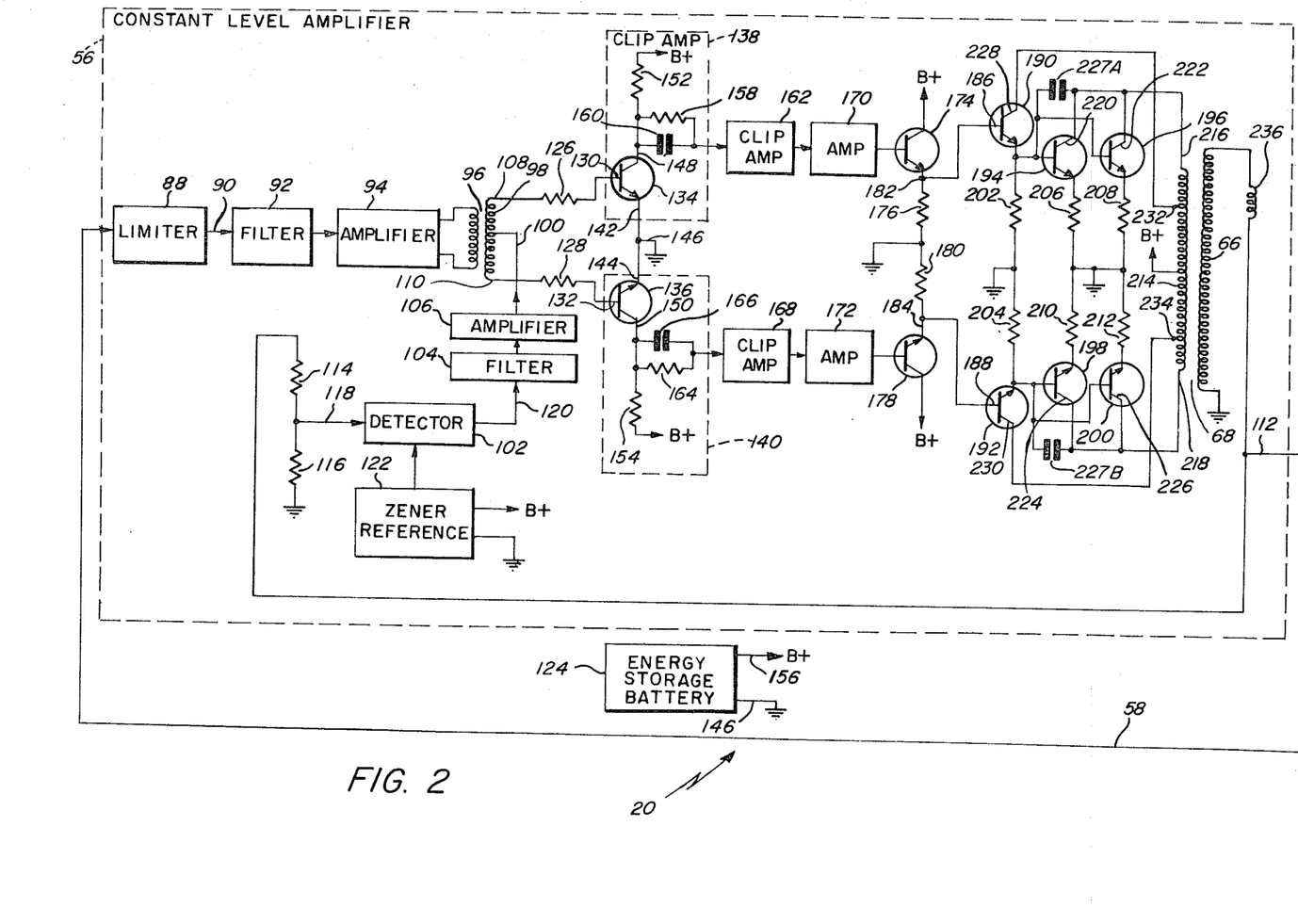
FIGS. 2, 3, 4 and 5 taken together is a schematic diagram, partially in block diagram form, of the circuitry utilized in the invention.
Figure 3:
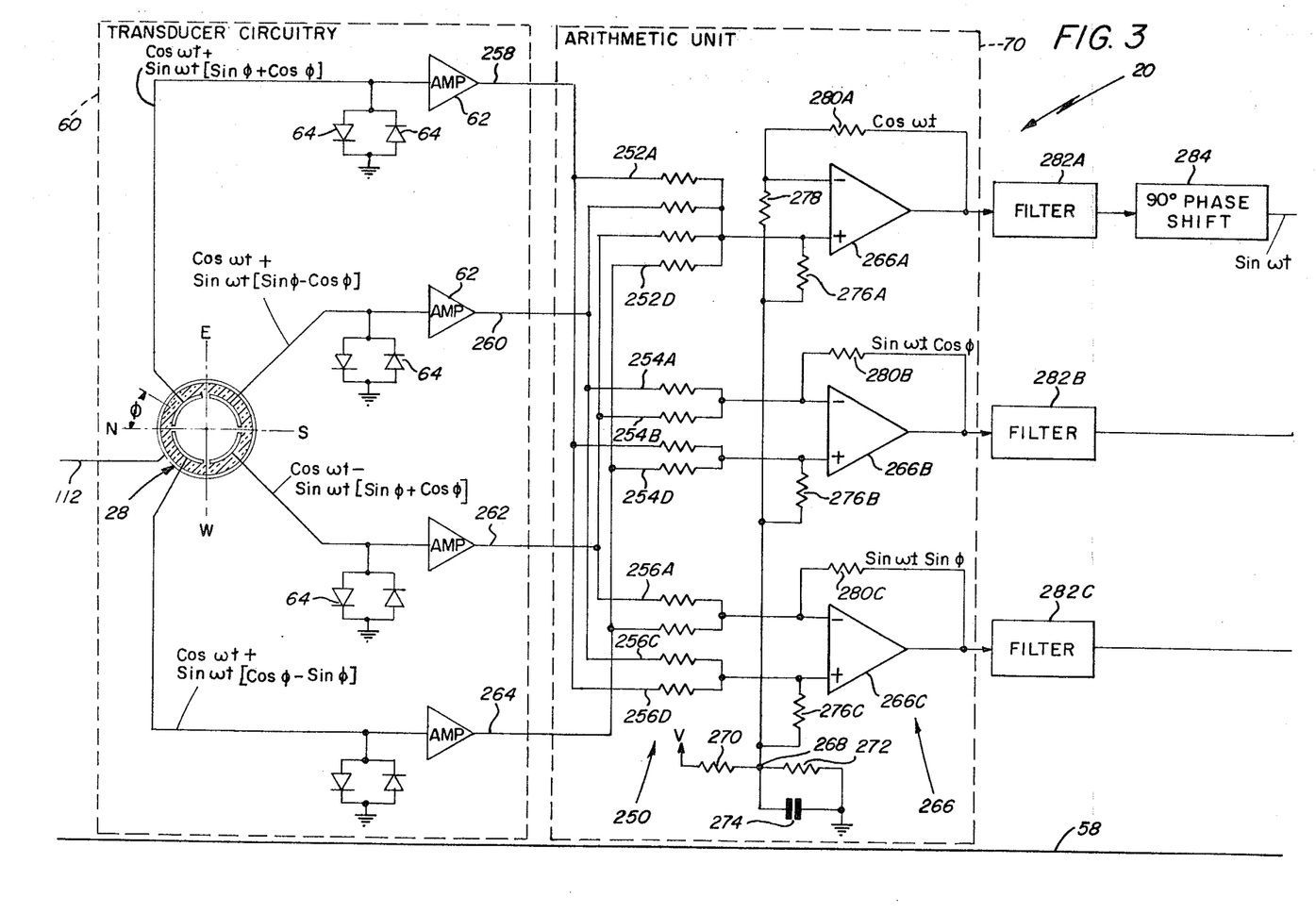

Referring now to FIGS. 2, 3, 4 and 5, taken together, there is seen a schematic diagram, partially in block diagram form, of the transducer system 20 of FIG. 1. An amplifier 56 of FIG. 2 receives a signal along line 58 provided by the signal generator 54 of FIG. 4 and amplifies this signal to a power level suitable for driving the transducer 28, a cross-sectional view of which appears in FIG. 3. As seen in FIG. 3, transducer circuitry 60 comprising preamplifiers 62 and back-to-back diodes 64 forms in conjunction with the secondary winding 66 of a transformer 68 a transmit-receive (T-R) circuit through which the signals from the amplifier 56 are applied to the transducer 28, and echoes received by the transducer 28 are passed onto an arithmetic unit 70. The arithmetic unit 70 combines the signals received by various portions of the transducer 28 in a manner to be described to form three channels identified by legands in FIG. 4 as OMNI, (omnidirectional) N-S (north-south) and E-W (east-west). For convenience, these three channels will sometimes be referred to, respectively, as the first, second and third channels. The three channels are passed through a gain compression circuit 72 of FIG. 4 which reduces the dynamic range of the amplitudes of the signals so that less bandwidth is required to transmit these signals via the telemetry system 38. The amplifier 56, the transducer circuitry 60, the arithmetic unit 70 and the gain compression circuit 72 are all contained within the sonobuoy 26. These circuits as well as the signal processor 50 of FIG. 5 will now be described in greater detail.

Referring now specifically to FIG. 2, the signal on line 58 is typically a pulse which is modulated on a carrier having a phase which may be modulated in a desired manner. Thus, by way of example referring momentarily to the signal generator 54 of FIG. 5, an oscillator 74 provides a sinusoidal waveform which serves as the carrier of the signal on line 58, the oscillator 74 being adapted to receive a modulation signal from phase modulator 76 to generate a carrier having a desired modulation pattern. In addition, the sinusoidal waveform of the oscillator 74 is passed through an amplitude modulator 78 which may be, for example, simply a gating circuit to provide pulses of the sinusoidal waveform signal of the oscillator 74. The occurrences of the amplitude and phase modulation by the modulators 76 and 78 are coordinated by a timing unit 80 so that the signal pulses on line 58 occur at regular intervals in response to the timing unit 80.

It is noted, in passing, that the signal on line 58 and the signals of the three channels OMNI, N-S and E-W as well as signals from a direction sensor 82, namely a reference signal and at angle signal on lines 84 and 86, to be described hereinafter, and are transmitted via the telemetry system 38 by well known techniques of modulating these signals on subcarriers which are, in turn, modulated onto a carrier having a frequency suitable for transmission between the antenna 42 of the sonobuoy 26 and the station 48 of FIG. 1. Thus, for example, the sonobuoy 26 includes circuitry, not shown in the Figures for modulating the signals onto the subcarriers, and the transceiver 40 of the sonobuoy 26 is equipped for transmitting at one carrier frequency and receiving at a second carrier frequency utilizing a well know diplexer for separating transmitted signals from received signals.

Figures 5, 6, 7:
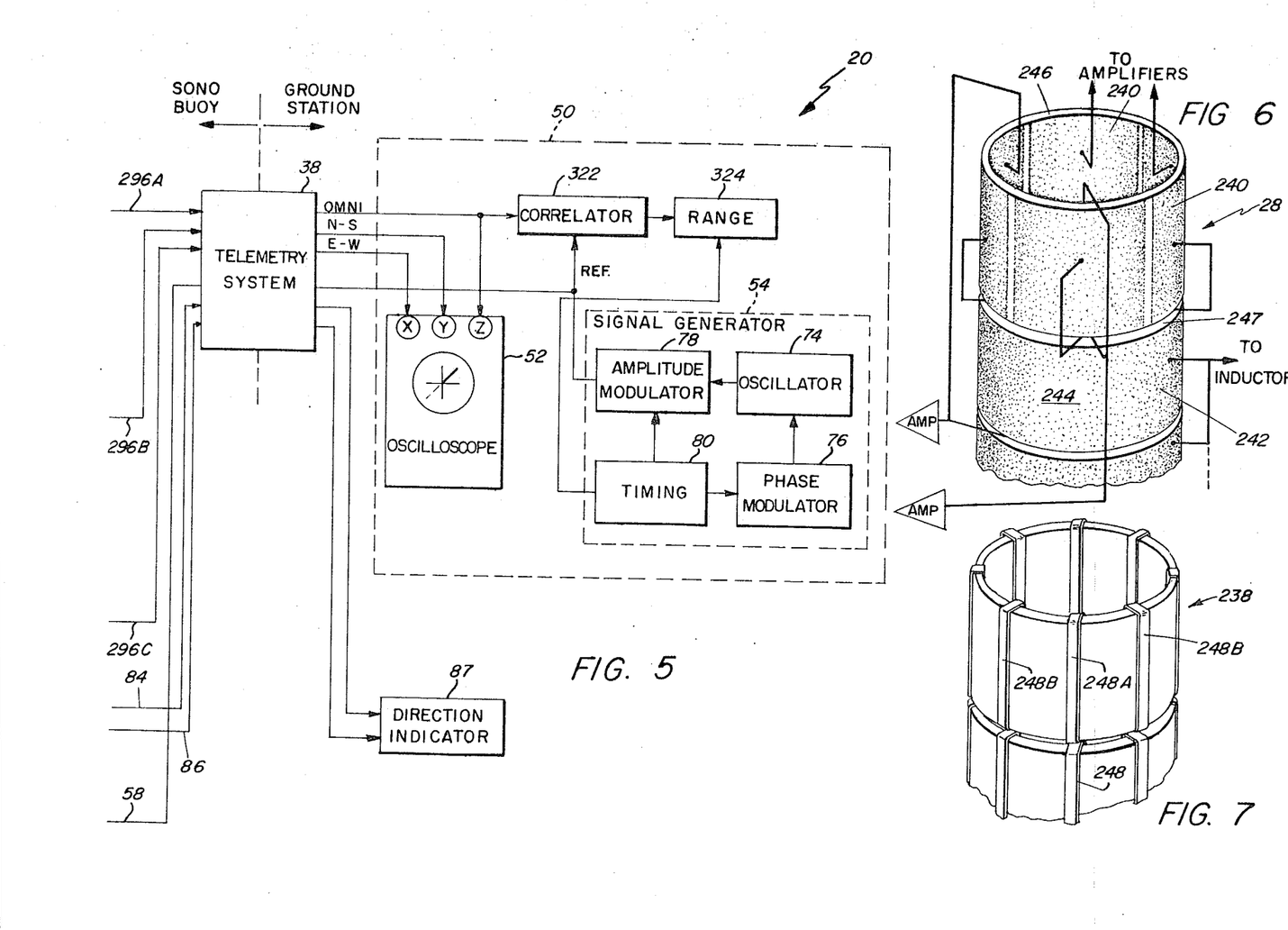
FIGS. 6 and 7 show two configurations of electrode interconnections with a cylindrical transducer utilized in the invention, the electrodes of FIG. 6 exciting a radial vibratory mode and those of FIG. 7 a tangential vibratory mode.

With respect to the direction sensor 82, it is noted that the sonobuoy 26 is free to twist about its mooring chain 30 so that a direction of a submerged object, as provided by the transducer 28, is relative to the sonobuoy 26 only. To provide a true indication of direction, the direction sensor 82 is utilized to detect the orientation of the sonobuoy 26. The direction sensor 82 is of a well known configuration and may be of gyroscopic form or alternately may utilize means responsive to the earth's magnetic field such as a flux gate magnetometer utilizing a donut shaped element of magnetic material having a generally square hysteresis loop and a reference winding for energizing the magnetic material while a secondary winding (the angle signal on line 86) senses harmonics of the reference signal as the domains of the magnetic material switch state in response to the earth's magnetic field. A directional indicator 87 in FIG. 5 is responsive to the signals on lines 84 and 86 for sensing the phases of these signals to provide, in a well known manner, an indication of the orientation of the sonobuoy 26. If desired, the signals on line 84 and 86 can be combined, by means not shown in the Figures, with the N-S and E-W channels to provide a time indication of direction on the display 52. Since technology of such direction correction circuitry is well known, it will not be described further.

Returning to FIG. 2, the signal on line 58 is applied to a limiter 88 to provide a signal on line 90 of fixed amplitude but having the same pulse width and carrier phase characteristic of the signal on line 58. The signal on line 90 is then filtered by filter 92 to restore the sinusoidal waveform and amplified by amplifier 94 to provide a signal at the transformer 96 having the same form as the signal on line 58. The secondary winding 98 of transformer 96 receives at its center tap a bias voltage on line 100 from a detector 102 via a filter 104 and amplifier 106. The signal provided by the amplifier 94 appears at each branch of the secondary winding 98 on lines 108 and 110 but with opposite polarity relative to the bias voltage on line 100, the two lines 108 and 110 being the two inputs to the symmetrical portions of the amplifier 56 which will be described hereinafter.

Continuing further with the description of the bias voltage on line 100, the detector 102 senses the level, or magnitude, of the average power applied along line 112 to the transducer 28 of FIG. 3, this sensing being accomplished with the aid of a voltage divider comprising resistors 114 and 116 so that the voltage reaching the detector 102 along line 118 is a small fraction of the voltage of the signal on line 112. For example, in a preferred embodiment, the ratio of the voltages on line 112 and 118 is approximately 20:1. The output of the detector 102 on line 120 is related to the difference of the signal on line 118 and that provided by a reference 122. The reference 122 may comprise, for example, a well known circuit utilizing a zener diode so that even in the event that there is a variation in the voltage of the battery 124 which energizes the circuit of the reference 122, the value of the reference supplied to the detector 102 remains constant.

The transformer 96 provides a dual output on lines 108 and 110 which connect respectively via resistors 126 and 128 to the base terminals 130 and 132 of transistors 134 and 136 in the clipping amplifiers 138 and 140. The signal voltages appearing on lines 108 and 110 are of a sufficiently large value to overdrive the transistors 134 and 136 so that with large positive swings in the voltages on lines 108 and 110, the transistors 134 and 136 are driven into saturation. The transistors 134 and 136 have their respective emitter terminals 142 and 144 connected to the return circuit of the battery 124, here shown as ground 146. The respective collector terminals 148 and 150 are connected via resistors 152 and 154 to the positive voltage terminal 156 of the battery 124, the resistors 152 and 154 being of sufficient magnitude to limit the power dissipated by the transistors 134 and 136 as well as to facilitate their being driven into a state of saturation. The collector terminal 148 is connected via resistor 158 and capacitor 160 to a clipping amplifier 162 which has the same form as the clipping amplifier 138. The resistor 158 and the capacitor 160 facilitate coupling of the signal from the collector terminal 148 to the clipping amplifier 162. In a similar manner the collector terminal 150 is connected via a resistor 164 and a capacitor 166 to a clipping amplifier 168 which has the same form as the clipping amplifier 140.

Since the signals on lines 108 and 110 are 180° out of phase, the clipping by the clipping amplifier 138 occurs one-half cycle before (or after) the clipping by the clipping amplifier 140. Since both the clipping amplifiers 138 and 140 clip respectively the positive swings of the voltages on lines 108 and 110, the result is that the clipping amplifier 138 clips a portion of the signals falling within the positive portion of the signal provided by the amplifier 94 while the clipping amplifier 140 clips a portion of the signal corresponding to a negative portion of the signal provided by the amplifier 94. By using the additional clipping amplifiers 162 and 168 a symmetrically clipped substantially square waveform signal is applied respectively to the amplifiers 170 and 172. The duty factors of these square waves are less than unity with a dead space of zero voltage appearing between a positive portion and a negative portion in each of the square waves.

The duty factor of the square wave signals of amplifiers 170 and 172 depends on the magnitude of the bias voltage on line 100 as well as the rise and the fall times of the leading and trailing edges of any pulse signal applied to the amplifier 94. In this embodiment the use of the filter 92, as has been mentioned before, imparts a sinusoidal voltage signal to the amplifier 94; however, it is recognized that this clipping circuitry would operate in a substantially equivalent manner if a trapezoidal or triangular waveform rather than the sinusoid were applied to the amplifier 94. For example, in the case of a triangular waveform the duty factory of pulses appearing at the amplifiers 170 and 172 varies in a substantially linear manner with the magnitude of the bias voltage on line 100, as is readily seen, since the clipping of a triangular pulse results in a trapezoidal pulse having a width directly related to the amount of clipping. It is noted that the bias voltage on line 100 need vary only from a value of zero to a positive value of voltage since a negative voltage would have the same clipping effect as a positive voltage due to the symmetry of the circuitry. It is noted that in response to a positive value of the bias voltage on line 100, there is provided the identical clipping effect by both transistors 134 and 136 since each clips only on a positive portion of the voltage on the lines 108 and 110.

Continuing with the description of he amplifier 56, the amplifiers 170 and 172 connect respectively with emitter follower circuits comprising transistor 174 and resistor 176, and transistor 178 and resistor 180 for driving the relatively low impedance load presented by the succeeding stages of the amplifier 56. The emitter terminals 182 and 184 of the transistors 174 and 176 connect with the base terminals 186 and 188 of driver transistors 190 and 192 which drive respectively the parallel combination of power transistors 194 and 196 and the parallel combination of power transistors 198 and 200. The emitter terminals of transistors 190–200 are connected respectively via resistors 202–212 to ground 146. The primary winding 214 of transformer 68 has a center tap connected to the positive voltage terminal 156 of the battery 124, and the end terminals 216 and 218 of each branch of the primary winding 214 are connected respectively to the collector terminals 220–222 of transistors 194–196 and to collector terminals 224–226 of transistors 198–200 for supplying electric power from the battery 124 to the transistors 194–200. A capacitor 227A is connected between the base and collector terminals of power transistors 194–196 and a similar connection with capacitor 227B is provided for power transistors 198–200 for improved coupling with transformer 68 and improved stability. The transistors 190 and 192 are energized with electric power from the battery 124 by a novel connection of their collector terminals 228–230 with taps 232–234 of the primary winding 214.

With respect to the novel interconnection of the collector terminals 228–230 it is noted that it is desirable to reduce the power dissipated within the driver transistors 190–200. To accomplish a smooth transition of power flow from the transformer 68 to the transducer 28 of FIG. 3, the capacitance of the transducer 28 has been tuned out in a well known manner by inductor 236 serially connected between the transducer 28 and the secondary winding 66. The inductor 236 may be provided with a slug for varying the inductance or alternatively may be provided with a set of taps for matching the inductance with the magnitude of the capacitance of the transducer 28. Since the transformer 68 has been provided with a resonant load, namely, the inductor 236 in combination with the capacitance of the transducer 28, the power transistors 194–200 may be operated in a mode wherein each transistor is saturated during a portion of the signal cycle and is nonconducting during the remaining portion of the signal cycle since the pulsations of energy thereby provided to the transformer 68 are smoothed by the energy storage of the inductor 236 and the capacitance of the transducer 28. In such a mode of operation, it is evident that power is dissipated in the power transistors 194–200 only during transition stages between a state of saturation and a state of nonconduction.

It is similarly desirable to reduce the power in the driver transistors 190–192. The driver transistors 190–192 are not necessarily operated in a saturated mode even when the power transistors 194–200 are saturated. For example, if additional power transistors (not shown) were inserted in parallel with the parallel combination of the transistors 194–196 and the parallel combination of transistors 198–200, the total base current drawn by each of these parallel combinations of transistors may vary with temperature as well as age of the transistors; so that in order to insure an appropriate amount of base current for proper saturated operation, it may be desirable to operate the driver transistors 190–192 out of saturation yet with a minimal collector voltage to reduce power dissipation within the driver transistors 190–192 while maintaining approximately linear operation of these transistors. When the power transistors 194–200 are nonconducting, little current is drawn by the driver transistors 190–192. However, when the power transistors 194–196 are saturated, a substantial amount of current is drawn through the driver transistor 190, and similar comments apply to the drawing of current from the driver transistor 192 by the power transistors 198–200. To reduce the power dissipation in the driver transistors 190–192 during the periods of high current flow, the taps 232 and 234 of the primary winding 214 are spaced from the end terminals 216 and 218 so that the voltage drop between the tap 232 and the end terminal 216 as well as the voltage drop between the tap 234 and the end terminal 218 are equal to the aforementioned minimum voltage required by the driver transistors 190–192 during periods of maximum current flow in the respective branches of the primary winding 214. For example, if the voltage of battery 124 is 40 volts, then, during those periods of time when the power transistors 194–196 are saturated, nearly 40 volts appears between the center tap of the primary winding 214 and the end terminal 216, while there appears between the taps 232 and the end terminal 216 only a few volts equal to the voltage drop across the resistor 202 and the aforementioned minimum voltage across the transistor 190. Similar comments apply to the relationship between the tap 234 and the transistor 192.

Referring now to FIGS. 2 and 3, the transducer circuitry 60 provides the transmit-receive (T-R) function in the following manner. When power is being transmitted from the transducer 28, electric current flows through the secondary winding 66, the inductor 236, and the back-to-back diodes 64 via ground 146 to alternately charge and discharge the capacitance of the transducer 28 during alternate portions of the substantially sinusoidal waveform signals on line 112. The voltage provided by the secondary winding 66 is much larger than that required to induce forward conduction in a diode 64 so that the diodes 64 are conducting during the transmission. The diodes 64 protect the preamplifiers 62 from the high voltages associated with the transmission function since the maximum voltage appearing at the input terminal to any one of the preamplifiers 62 is no greater than the forward conduction voltage of these diodes (on the order of one-half volt with silicon diodes). Signals received by the transducer 28 are of a low voltage, normally lower than the voltage required to induce forward conduction in the diodes 64, with the result that current induced in the transducer 28 by radiation incident thereon flows through the secondary winding 66, the inductor 236 and the preamplifiers 62. Virtually no current flows through the diodes 64 during the reception of relatively weak signals.

In operation, therefore, with respect to FIGS. 2, 3, 4 and 5, a signal generated by the signal generator 54 is initiated by the timing unit 80 and passes via the telemetry system 38 along line 58 to the limiter 88 and the filter 92 which provides a fixed-amplitude pulsed signal having a carrier which may be phase modulated. This signal is then applied via amplifier 94 to the constant level amplifier 56 which amplifies this signal to a constant power output level for energizing the transducer 28 independently of variations of the voltage of the battery 124. Therefore, as the battery ages and the voltage slowly decreases, the power output of the signal on line 112 remains substantially constant. The constant level amplifier 56 comprises clipping stages in a symmetrical format for clipping the positive and negative portions of the signal of amplifier 94, thereby varying the duty factor of the signal applied on line 112 to the transducer 28. The detector 102 is responsive to the voltage across the transducer 28, or equivalently, the power applied to the transducer 28 since the impedance of the transducer circuit is of a constant value. The detector 102 compares the signal on line 118 against the reference 122 to provide the bias voltage on line 100 to establish the requisite clipping level for maintaining the desired power level during variations of the battery voltage between the positive voltage terminal 156 and ground 146. To minimize unwanted dissipation in the driver transistors 190–192, these transistors are energized from the battery 124 through the taps 232 and 234 which provide a minimum voltage, even when the power transistors 194–200 are saturated, for operating the driver transistors 190–192 in a generally linear mode of operation.

Referring momentarily to FIGS. 6 and FIGS. 7, there are shown two configurations for a transducer formed of an array of cylindrical transducer elements. The transducer 28 is partially seen in FIG. 6 while the view of FIG. 3 represents a cross-sectional view taken through the center of the array in a plane perpendicular to the axis of the array. In both the transducer 28 of FIG. 6 and the transducer 238 of FIG. 7, the cylindrical sections have a circumferential length of approximately 1 wavelength of the soundwaves in the fluid medium (the ocean) and are fabricated from piezoelectric material such as barrium zirconate titanate formed with a preferred axis of vibration in the radial direction in the case of the transducer 28 and in the tangential direction in the case of the transducer 238. The transducers 28 and 238 are encased with well known material (not shown) which improves the impedance match between the water and the barrium zirconate titanate. The transducer 28 is excited by impressing a voltage across electrodes in the form of plates 240 resembling the plates of a capacitor and being formed by the deposition of a metallic conductor such as silver. Thus, each capacitor type section can function as a separate receptor of acoustic energy. The central cylindrical sections 242 of the transducer 28 contain a single continuous plate 244 covering the outer surface of the cylindrical section 242 while the end cylindrical section 246 uses similar plates 240 both on the interior and exterior surfaces. The continuous plate 244 is utilized in the central cylindrical sections 242 in order to facilitate connection of these sections to the conductor 112 of FIG. 3. The separation of the plates 240 in the end cylindrical section 246 are provided to permit a serial interconnection of the individual capacitor sections of the end cylindrical section 246 with the corresponding capacitor sections of the central cylindrical sections 242 thereby coupling the impedance presented by the two sections 242 and 246 at the end of the axis of the transducer 28 to provide a "shading" to the energization of the transducer 28 to reduce the side lobes of the transducer directivity pattern. As is well known, a contraction along the radial direction of the material in one of the sections 242 or 246 results in an expansion in the tangential and axial directions of the material, and vice versa. Thus, the piezoelectric material of the transducer 28 vibrates in all three directions and, accordingly, the individual sections such as the sections 242 and 246 are separated by a small gap 247 in a manner well known in the technology of building sonar transducers to permit the independent vibrations of these individual sections.

With respect to the transducer 238 of FIG. 7, the operation is substantially the same as that of the transducer 28 with vibrations of the piezoelectric material occurring in all three directions. However, here the tangential mode of vibration is directly excited such that a contraction in the tangential direction results in an expansion of the piezoelectric material in the axial and radial directions. The piezoelectric material is excited by means of electrodes in the form of bands 248, some of which are further identified by suffixes 248A-B, which encircle the cylindrical sections along a plane containing the axis of the cylinder. It is understood that while circular cylindrical sections are shown here, other cylindrical sections may also be utilized, but the circular cylindrical section is preferred in the present application since the directivity pattern of the transducer is substantially the same in the various azimuthal directions. Electrical fields are impressed between the bands 248A and 248B for inducing the expansion and contraction along the tangential direction. Such a transducer is described in the U.S. Pat. No. 3,290,646 which issued to Ehrlich et al. on Dec. 6, 1966.

Returning now to FIG. 3, arithmetic unit 70 comprises a set of summing resistors 250 of which the individual resistors are identified by the numerals 252A-D in channel 1 of the arithmetic unit 70, and 254A-D and 256A-D respectively for resistors in channels 2 and 3 of the arithmetic unit 70. these resistors 250 are interconnected via lines 258-264 to the preamplifiers 62. The summing resistors 250 are connected with operational amplifiers 266 which are further identified by subscripts 266A-C respectively for the operational amplifiers in channels 1-3. A reference voltage at terminal 268 is provided by the voltage divider circuit formed of resistors 270 and 272 and a capacitor 274, and is connected to the noninverting inputs (indicated by plus signs) of the operational amplifiers 266 by means of resistors 276A-C. The reference voltage at terminal 268 is also applied to the inverting input (indicated by a minus sign) of the operational amplifier 266A via resistor 278. Feedback resistors 280A-C connect the output terminal of each operational amplifier 266 with its inverting input terminal to establish the appropriate gain of each of the operational amplifiers 266.

The facilitate explanation of the summing operation, the various signals of each of the sections of the transducer 28 as well as the output signals of the operational amplifiers 266 are represented by mathematical notations in FIG. 3. Thus, it is readily verified that by connecting the signals on lines 258-264 via the summing resistors 252A-D to the noninverting input of the operational amplifier 266A provides the output signal indicated on the Figure. Similar comments apply to the application of the signals on lines 260-262 via resistors 254A-B to the inverting input and the application of the signals on lines 258 and 264 via resistors 254C-D to the noninverting input of the operational amplifier 266B, and also with respect to the application of the signals on lines 262 and 264 via summing resistors 256A-B to the inverting input and the application of the signals on lines 258 and 260 via summing resistors 256C-D to the noninverting input of the operational amplifier 266C. Each of the signals provided by the operational amplifiers 266 are filtered by filters 282A-C to reduce the amount of unwanted noise, such as sea-state noise, in the signals provided by the operational amplifiers 266. In addition a phase shifter 284 provides a 90° phase shift to the signal of channel 1 so that the signals in the three channels have the same phase but differ in amplitude.

In operation, therefore, the signals appearing in each of the four preamplifiers 62 are combined arithmetically to form the sums and differences of these signals via the summing resistors 250 and the operational amplifiers 266. The operational amplifiers 266, the resistors 250 and the preamplifiers 62 are of sufficiently small size to be readily packaged within the sonobuoy 26 of FIG. 1 with the interior region of the transducer 28 providing space for such packaging. The output signals of the operational amplifiers 266 in each of the three channels are filtered by filters 282A-C to reduce excess noise and finally the signal of channel 1 is phase shifted 90° by the phase shifter 284 so that all signals in the three channels have the same phase as indicated by the mathematical notations in FIG. 3.

Referring again to FIG. 4, the gain compression circuit 72, as has been mentioned earlier, is utilized to reduce the dynamic range in the amplitude of the signals appearing in the three channels to facilitate modulating these signals onto subcarriers for transmission by the telemetry system 38. Telemetry systems frequently use phase modulation, or frequency modulation, for modulating such signals on the subcarriers. As is well known the bandwidth required to transmit such signals depends on the modulation index which, in turn, depends on the maximum range in amplitude of the signals. For example, sonar signals received at the transducer 28 can have a wide variation in their dynamic range as is readily seen by comparing the amplitude of noise received from distant marine life with engine noise produced by a boat passing nearby. To indicate the presence of a submerged object, it is sufficient in the present situation to notice either the presence or absence of a signal in the OMNI channel; the particular amplitude of the signal being of only secondary importance for making a range measurement. Similarly, with respect to a direction measurement, the relative amplitudes of the signals in the second and third channels are significant and their absolute magnitudes are of secondary importance.

Figure 4:
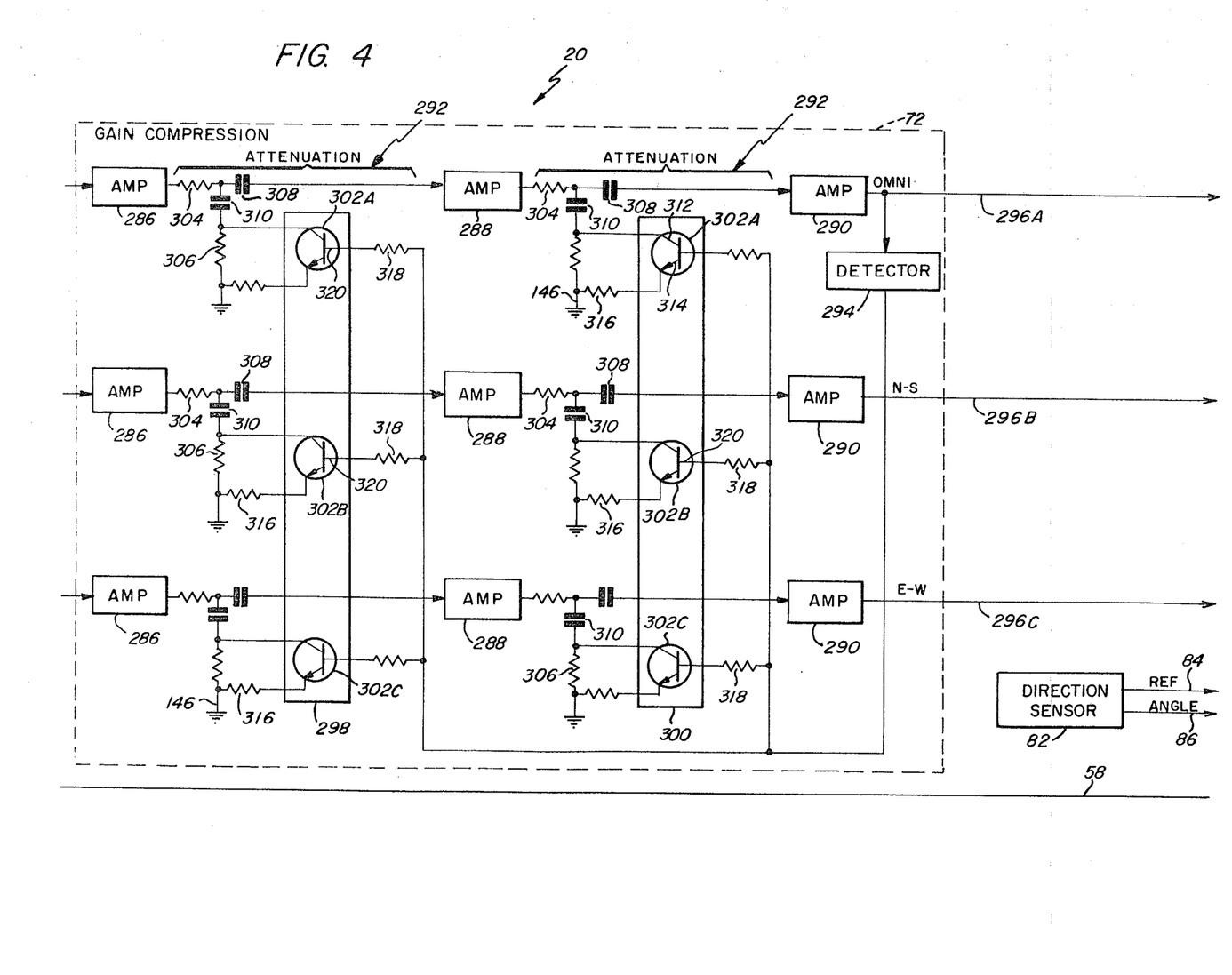

Accordingly, the gain compression circuit 72 comprises a set of three amplifiers 286–290 in each of the three channels, these amplifiers being interconnected by attenuation circuits 292. The amplifiers 286–290 are of conventional design utilized to bring the received sonar signals to an adequate power level for transmission via the telemetry system 38. The attenuation circuits 292 are made responsive to the amplitude of the signal in the OMNI channel by means of a detector 294 for varying the overall gain of each of the three channels to maintain a substantially constant power output level on lines 296A–C.

As is well known, in situations such as the present where it is desired to vary the overall gain of three channels while retaining the relative amplitudes of each of the signals, it is essential to have a variable gain (or attenuation) device in each channel having the same gain (or attenuation) characteristics as the corresponding devices in the other channels in order to avoid the use of complex gain monitoring circuitry. A novel approach to this problem is provided in the present system by means of chips 298 and 300 on which are formed a set of three transistors 302A–C which are fabricated together such that the three transistors 302A–C share a common substrate. Such a transistor array is commercially available as the RCA (Radial Corporation of America) type CA3018A. The characteristics of the transistors 302A–C are substantially identical so that the impedance presented by each of their collector-emitter terminal pairs depend in a substantially identical manner upon base-emitter current in each of these transistors 302A–C of a particular chip such as chip 298.

The attenuation circuit 292 comprises three identical circuits, one for each of the three channels, each circuit comprising resistors 304 and 306 and capacitors 308 and 310 which form a voltage divider circuit to provide a fraction of the output voltage of amplifier 286 or 288 for coupling by a capacitor 308 to the next amplifier, respectively, amplifier 288 or 290. The transistor 302A is connected via its collector terminal 312 to the junction of the capacitor 310 and the resistor 306, and is also connected via its emitter terminal 314 via resistor 316 to ground 146. Thus the collector-emitter terminal pair impedance in series with the emitter resistor 316 is connected in parallel with the resistor 306 with the result that any variation in the collector-emitter impedance alters the impedance between the capacitor 310 and ground 146. The resistors 316 as well as resistors 318 connecting with the base terminals 320 are used to control the magnitude of the base emitter current in each transistor in response to the output voltage of the detector 294.

In operation therefore the detector 294 of the gain compression circuit 72 senses the magnitude of the signal in the OMNI channel, and in response thereto imparts a base emitter current in each of the transistors 302A–C in the chips 298 and 300. The collector-emitter impedance of each of the transistors 302A–C in the chips 298 and 300 appears in circuit with the resistor 306 in each channel within the attenuation circuit 292 and, therefore, the voltage divider function provided by each pair of resistors 304 and 306 is modified by the base emitter current of the transistors 302A–C so that the voltage passed by each capacitor 308 is that fraction of the output voltage of the amplifier 286 or 288 which maintains a substantially constant signal magnitude on each of the lines 296A–C independently of variations in the strength of signals received by the transducer 28 of FIG. 3.

Referring again to FIG. 5 there is shown, by way of example, a correlator 322 having a well known form such as for example that disclosed in the U.S. Pat. No. 3,488,635 which issued to Sifferlin on Jan. 6, 1970, wherein the signal provided by the signal generator 54 is utilized as a reference for comparison with the signal arriving on the OMNI channel from the telemetry system 38. As is well known, the correlator 322 provides an output signal indicating the time of occurrence when the signal on the OMNI channel most nearly approximates the reference thereby indicating the time or arrival of the OMNI signal. The output of the correlator 322 is applied to a range indicator 324 which, in response to a timing signal from the timing unit 80, provides an indication of the range of an object in the ocean 24 of FIG. 1 which has reflected an echo of sonic energy to the transducer 28 in response to an earlier transmission of sonic energy from the transducer 28.

The angular direction of he submerged reflecting object is readily seen on the display 52 which has the form of an oscillascope. The X and Y axis inputs to the oscillascope of the display 52 utilizes deflection signals provided respectively by the E-W channel and the N-S channel. Since both these signals are in phase the relative amplitudes of these signals, as indicated by the mathematical notations on FIG. 3, provide the X and Y coordinates of the submerged reflecting object; and the application of the OMNI signal to the Z axis of the oscillascope of the display 52, being in phase with the signals of the other two channels, brightens the display in one of the quadrants such as the north-east quadrant, depicted in FIG. 5, and thereby resolves the ambiguity of quadrant, namely, the north-east or south-west quadrant, inherent in the information provided by the N-S and E-W channels.

It is understood that the above described embodiments of the invention are illustrative only and that modifications thereof will occur to those skilled in the art. Accordingly, it is desired that this invention is not to be limited to the embodiments disclosed herein but is to be limited only as defined by the appended claims.

What is claimed is:

1. In combination:
   Limiter means for converting an input signal into a pulse train signal in which the pulses have substantially trapezoidal waveforms of uniform amplitude;
   a circuit adapted to receive said pulse train signal and responsive to a bias voltage, said circuit clipping said pulse train signal at a value in accordance with said bias voltage to vary the duty factor of said pulse train signal by an amount related to the rate of change of the edges of pulses in said pulse train signal; and
   detection means responsive to the magnitude of the power output of said circuit for comparing said magnitude with a reference signal to provide said bias voltage thereby varying the duty factor of said pulse train signal to maintain a substantially constant average power output of said circuit independently of variations in power supply voltages which energize said circuit.

2. The combination according to claim 1 wherein said circuit has a symmetrical form for varying the duty cycle of both positive and negative pulse train signals.

3. The combination according to claim 2 wherein said symmetrical circuit comprises a first pair of transistors having their emitter terminals connected in circuit with a common terminal of a power supply, each of said transistors having their base terminals connected in circuit respectively with each of two terminals of a transformer winding symmetrically relative to a center tap of said winding, and said center tap being connected to receive said bias voltage.

4. The combination according to claim 3 in which clipped positive pulse train signals appear at the collector terminal of one of said transistors, and clipped negative pulse train signals appear at the collector terminal of the second of said first pair of transistors.

5. The combination according to claim 4 in which said symmetrical circuit further comprises a second pair of transistors symmetrically coupled to said first pair of transistors for further clipping said clipped positive and said clipped negative pulse train signals.

6. The combination according to claim 5 wherein said circuit further comprises a symmetrical amplifier for combining said positive and negative pulse train signals at a signal output terminal pair for applying said pulse train signals with a varied duty factor to a load.

7. The combination according to claim 6 in which said amplifier is a push-pull amplifier comprising power stages and driver stages for driving said power stages, said power stages being connected to the primary winding of an output transformer for coupling power into said transformer, said power supply voltage being applied between a center tap of said primary winding and a terminal of each of said power stages and said driver stages, and a second terminal of a driver stage being connected to a tap of said primary winding.

8. The combination according to claim 7 wherein a maximum current flows in said primary winding when a clipped portion of a pulse of said pulse train signals is applied to said amplifier, the voltage drop between said tap and an interconnection of said power stage with said primary winding during a flowing of said maximum current being substantially equal to the minimum supply voltage required by one of said driver stages to maintain relatively linear operation of said driver stage when said power stages are in a saturated non-linear mode of operation.

9. The combination according to claim 8 wherein the pulses of said input pulse train signal are portions of a sinusoid waveform, and a tuned transducer is interconnected at said output terminal pair to a secondary winding of said transformer for coupling power in a substantially sinusoidal waveform having a frequency equal to the frequency of said input sinusoidal waveform signal.

10. The combination according to claim 9 wherein said detection means further comprises an amplifier and filter for maintaining stable closed loop operation of said circuit and said detection means.

11. In combination:
   a transformer having a primary and a secondary winding;
   a supply of electrical power having a first terminal thereof connected to a turn of said primary winding;
   a first transistor having its collector-emitter terminals serially interconnected in circuit with a turn of said primary winding and a second terminal of said power supply;
   a second transistor having its collector-emitter terminals interconnected serially in circuit between the base terminal of said first transistor and a turn of said primary winding between the terminal of said power supply and said interconnection with said first transistor having a ratio with respect to the turns of said primary winding between the terminal of said power supply and the interconnection with said second transistor for supplying to said second transistor a minimum voltage necessary for maintaining substantially linear operation of said second transistor during a period of time when said first transistor is saturated;
   a clipper circuit, the base terminal of said second transistor being connected to said clipper circuit and said secondary winding being connected to a load, said clipping circuit including means responsive to a bias signal for varying the clipping level; and
   a source of signal coupled to said clipper circuit, said source of signal including means for limiting an input signal to a substantially trapezoidal waveform.

12. The combination according to claim 11 further comprising:
   a third transistor coupled to said primary winding in a circuit symmetrical to the coupling of said first transistor to said primary winding;
   a fourth transistor coupled to said third transistor in a circuit symmetrical to said interconnection of said second transistor with said first transistor; and means for connecting said source of signal in a symmetrical fashion to the base terminal of said fourth transistor.

* * * * *